US010646985B2

(12) United States Patent
Moan et al.

(10) Patent No.: US 10,646,985 B2
(45) Date of Patent: May 12, 2020

(54) METHOD AND APPARATUS FOR LIMITING EQUIPMENT BURDEN WHEN PENETRATING A MIXED OR COMPOSITE MATERIAL STRUCTURE INCLUDING METAL UTILIZING A HAMMER-DRILL

(71) Applicant: The United States of America as represented by the Secretary of the Navy, Crane, IN (US)

(72) Inventors: Brad Moan, Greenwood, IN (US); Eric Scheid, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 301 days.

(21) Appl. No.: 15/262,756

(22) Filed: Sep. 12, 2016

(65) Prior Publication Data
US 2017/0072550 A1    Mar. 16, 2017

Related U.S. Application Data

(60) Provisional application No. 62/217,777, filed on Sep. 11, 2015.

(51) Int. Cl.
*B25D 17/02*    (2006.01)
*B28D 1/14*     (2006.01)
(Continued)

(52) U.S. Cl.
CPC .......... *B25D 17/02* (2013.01); *B23B 51/009* (2013.01); *B23P 15/28* (2013.01); *B28D 1/146* (2013.01);
(Continued)

(58) Field of Classification Search
CPC ......... E21B 10/00; B23B 51/00; B23B 51/02; B23B 51/009; B23B 2228/36; B23B 2226/75; B23B 2251/60; B23B 2251/54; B23P 15/28; B28D 1/146; B25D 17/02; Y10T 408/906; Y10T 408/907; Y10T 408/9065
USPC ...................... 408/223, 224, 227, 229; 7/158
See application file for complete search history.

(56) References Cited

U.S. PATENT DOCUMENTS 5,871,059 A * 2/1999 Shibata ................ B25D 11/005
                                                173/133
6,019,553 A   2/2000 Yakamavich, Jr.
(Continued)

FOREIGN PATENT DOCUMENTS

CN    2892339 Y  *  4/2007
EP    2602063        6/2013

OTHER PUBLICATIONS

OhioPowerTool.com, Rebar Cutters Solve #1 Problem in Concrete Drilling, found at http://www.coptool.com/rebar-cutters-solve-1-problem-in-concrete-drilling/, Sep. 12, 2016.
(Continued)

*Primary Examiner* — David J Bagnell
*Assistant Examiner* — Manuel C Portocarrero
(74) *Attorney, Agent, or Firm* — Naval Surface Warfare Center, Crane Division

(57) ABSTRACT

A method employing an apparatus in conjunction with a hammer-drill to penetrate composite metal and non-metal structure or structures including, for example, thick metal or rebar encountered during concrete, rock or masonry boring operations without requiring a change in drill equipment.

13 Claims, 4 Drawing Sheets

(51) Int. Cl.
*B23B 51/00* (2006.01)
*B23P 15/28* (2006.01)
*E21B 10/00* (2006.01)
*B23B 51/02* (2006.01)

(52) U.S. Cl.
CPC ....... *B23B 2226/75* (2013.01); *B23B 2228/36* (2013.01); *B25D 2217/0007* (2013.01)

(56) References Cited

U.S. PATENT DOCUMENTS

| | | |
|---|---|---|
| 7,237,986 B2 | 7/2007 | Anjanappa et al. |
| 2005/0098358 A1* | 5/2005 | Nadler .................. B23B 49/005 175/394 |

OTHER PUBLICATIONS

DifferenceBetween.net, Difference Between SDS Plus and SDS Max, found at http://www.differencebetween.net/object/difference-between-sds-plus-and-sds-max/, Sep. 12, 2016.
SCUnitec.com, Annular Cutters, found at http://www.csunitec.com/drills/annular-cutters?PHPSESSID=70641baa287fc32af93828d0c523fe93, Sep. 12, 2016.
SCUnitec.com, Portable Magnetic Drills and Drilling Machines, found at http://www.csunitec.com/drills/portable-magnetic-drills-and-drilling-machines, Sep. 12, 2016.

\* cited by examiner

METHOD AND APPARATUS FOR LIMITING EQUIPMENT BURDEN WHEN PENETRATING A MIXED OR COMPOSITE MATERIAL STRUCTURE INCLUDING METAL UTILIZING A HAMMER-DRILL

CROSS-REFERENCE TO RELATED APPLICATIONS

The present application claims priority to U.S. Provisional Patent Application Ser. No. 62/217,777, filed Sep. 11, 2015, entitled "METAL CUTTING SDS MAX BIT," the disclosure of which is expressly incorporated by reference herein.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,285) is assigned to the United States Government and is available for licensing for commercial purposes. Licensing and technical inquiries may be directed to the Technology Transfer Office, Naval Surface Warfare Center Crane, email: Crane CTO@navy.mil.

BACKGROUND AND SUMMARY OF THE INVENTION

The present invention relates to a method employing an apparatus in conjunction with a hammer-drill to penetrate thick metal and rebar encountered during concrete, rock or masonry boring operations (hereafter referred to as "rock drilling") without requiring a change in drill equipment. Hammer-drills are recognized as the most efficient way to bore into concrete, rock, or masonry (hereafter collectively referred to as "rock") and are employed when the primary task is to penetrate such materials. By employing the present invention, operators are relieved of the necessity of carrying an additional drill or other equipment in order to address metal should any be encountered during rock drilling. Such an advantage will be particularly beneficial in situations where the transportation of a second drill, or other equipment, would be undesirable. The additional weight of a second drill, or other equipment, would be particularly undesirable in certain military operations or other operations in an austere environment.

On occasion, during rock drilling, metal plate or other inorganic materials are encountered, often unexpectedly, embedded in the rock. Neither the equipment nor bits in current use are capable of penetrating significant thicknesses of metal plate without great stress, damage or destruction to equipment and passage of significant or undesirable duration of time in rock drilling. In existing technology, rock drilling equipment is removed from a hole and specific equipment is substituted or exchanged to address drilling through different materials such as a plate, rebar, etc. Existing approaches have drawbacks, not the least of which is a need to stop rock drilling and the time and logistics associated with exchanging or substituting equipment and then replacing and resuming rock drilling once the dissimilar material, e.g., inorganic obstacle, is overcome.

Hammer-drill equipment can be used with rock drilling relying on a combination of low-rpm torsional moment and a repetitive axial force to penetrate a target material. The repetitive axial force is known as a "hammer feature" as its effect is the same as a hammer striking the end of a masonry chisel. As the name suggests, drills with this feature often achieve this effect by employing an internal hammer to strike an end of an inserted masonry bit. Typically, a masonry bit is a form of twist bit milled from relatively soft steel with a hardened chisel point braised onto the bit's end forming the cutting edges. The hammering motion breaks up the rock at the point of contact between the chisel point and the material being drilled, while the rotating flutes remove the resultant debris. For "heavy duty" hammer drills, such as those employing the Slotted Drive System (SDS) Max form factor bits, the hammer feature is always activated and cannot be disabled by the user.

Drill equipment associated with drilling into metal relies primarily on the torsional moment applied to the drill bit to employ the bit's geometry and achieve a desired cutting action, while the axial force primarily keeps the bit in contact with the target material. The cutting action is the result of the bit's cutting edge being rotated while in contact with the surface being drilled. If such a bit is employed in a drill with the hammer function active while attempting to drill through metal, the bit will rebound from the hardened surface with each blow of the hammer. This will prevent the engagement of the cutting edge with the surface and the loss of contact will result in the inability to penetrate the hardened material.

Existing steel cutting bits are not designed to be employed in a drill with an active hammer feature, cut large diameter holes, or to routinely encounter rock surfaces without rapidly dulling. Employing alternate means to penetrate the material so that drilling may resume, have certain drawbacks making their employment undesirable. Cutting torches require fuels, expendable rods or both and leave hot residue in the path of the drilling equipment. Falling slag is a safety hazard associated with some types of existing approaches. Torches and energetic/explosive systems cannot be used in all environments or scenarios. These restrictions are especially likely to be encountered underground or indoors.

Hammer-drilling equipment may be especially adapted for industrial or fixed site operations and the use of a specialized bit for penetrating the inorganic obstacle allows the continued use of the safer equipment. Improved bits allow for drilling of holes in metal with hammer-drilling equipment even if the hammer function cannot be disabled. An exemplary bit can be designed to cut steel and other metal at low revolutions per minute (RPM) while allowing for some contact with the rock surface behind the steel without rapidly destroying the tool or negatively affecting the drill's hammer function. Use of this exemplary bit during rock drilling allows the drilling to progress through steel and similar materials when encountered by simply changing the bit. Equipment can remain in place and torches and exothermic/energetic systems are no longer required with embodiments of the invention. Exemplary aspects of the invention can also reduce time associated with drilling through mixed materials and reduces the amount and types of equipment currently necessary to accomplish this task. These bits are designed for use on the surface or inside the bore hole.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Embodiments of the invention described herein are not intended to be exhaustive or to limit the invention to precise forms disclosed. Rather, the embodiments selected for description have been chosen to enable one skilled in the art to practice the invention.

Figure 1:
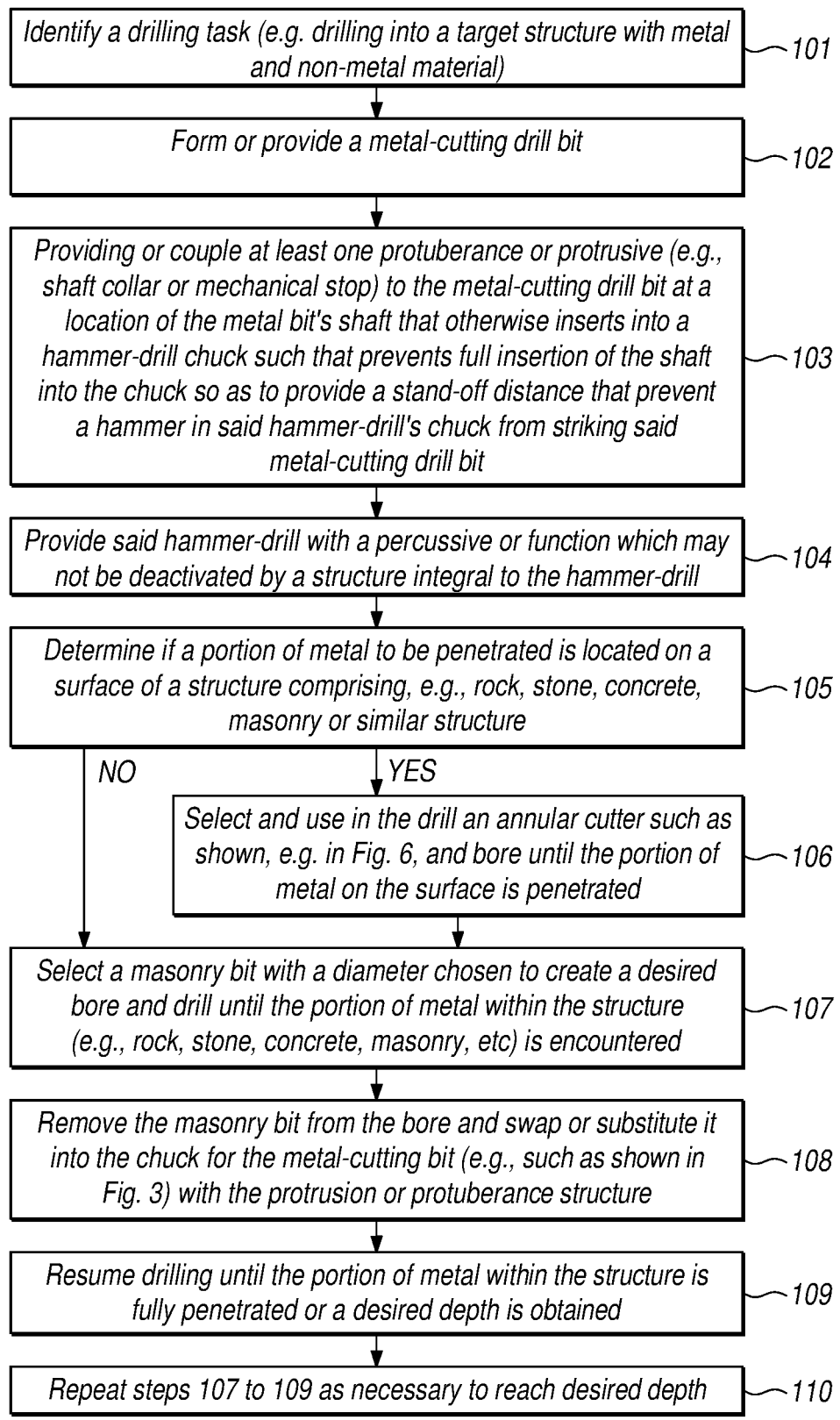
FIG. 1 shows an exemplary method of utilizing one embodiment of the invention.

FIG. 1. shows an exemplary method for employing an exemplary drill bit apparatus in conjunction with a hammer-drill to penetrate a portion of metal within a mixed material structure comprising metal and non-metal materials encountered during drilling operations without requiring a drill change, comprising: Step 101: identifying a task requiring rock, masonry, or concrete (or similar material) drilling with a hammer-drill in a location where a likelihood exists of encountering a portion of metal and where an operator or user of the drill is limited to carrying only a single hammer-drill; Step 102: forming or providing a metal-cutting bit comprising a cylindrical body formed with a first and second cylindrical sections, wherein the first section comprises a first end perpendicular to a longitudinal axis and a second end opposite thereof perpendicular to the longitudinal axis, the first section comprising a shank section, wherein the second section comprises a first end perpendicular to a longitudinal axis and a second end opposite thereof perpendicular to the longitudinal axis, the second section comprising a cutting section of a selected diameter to bore a desired diameter hole, and the first section's second end being coupled to the second section's first end so as to form the cylindrical body with a single longitudinal axis. Step 103: providing the metal-cutting bit with a minimum of one protuberance or protrusion (e.g., shaft collar or mechanical stop) to the shank at a point a first distance from a longitudinal end of the first section opposite the second section, wherein the first distance is selected so as to prevent full insertion of the first section into a hammer-drill chuck, and wherein the distance precludes a hammer in the hammer-drill's chuck from striking the longitudinal end of first section while the hammer-drill is in operation; Step 104: providing the hammer-drill wherein the hammer-drill's percussive feature is always active or cannot be deactivated by structures integral to the hammer-drill; Step 105: determining if the portion of metal to be penetrated is located on a surface of a rock, concrete, stone, masonry or similar material; if "yes," advance to step 106, but if the portion of metal is not visible, proceed to step 107; Step 106: selecting and using in the hammer drill the metal-cutting bit in an annular cutter embodiment (e.g., see FIG. 6) and boring until the portion of metal is penetrated; Step 107: selecting a masonry bit with a diameter selected to create a desired bore in the structure that includes rock, concrete, stone, masonry or similar material and drilling until the portion of metal within the structure is encountered; Step 108: removing the masonry bit from the hole and switching to or substituting the metal-cutting bit, e.g., shown in FIG. 3; Step 109: resuming drilling operations until the portion of metal is fully penetrated or a desired depth is achieved; Step 110: repeating steps 107 through 109 until a desired depth of bore is achieved.

Figure 2:
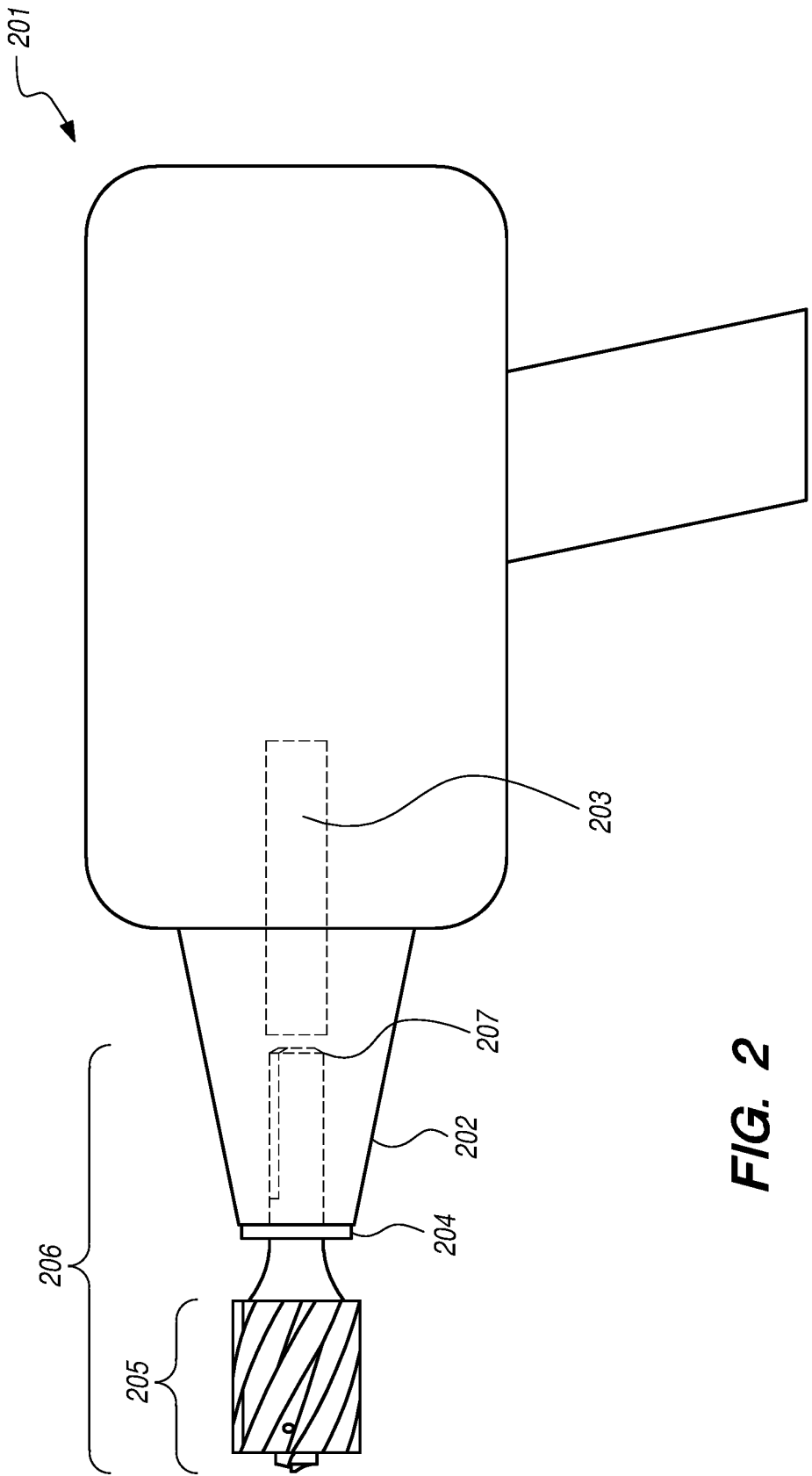
FIG. 2 shows an exemplary metal drilling system including a hammer drill system and exemplary metal cutting drill bit in accordance with one embodiment of the invention.

FIG. 2 shows a simplified embodiment of an exemplary metal drilling system comprising a drill 201 configured to apply a torsional moment to a bit 206 coupled to the drill by a chuck 202 and configured with a mechanical hammer 203 capable of striking an end 207 of the coupled bit so as to produce a repetitive axial force. The drill is not equipped with an integral system or structure adapted for deactivating the hammer function where the mechanical hammer is used for a purpose of penetrating masonry, stone, rock, concrete or similar material. When intended to penetrate a portion of metal, however, a protrusion or protuberance 204 is a coupled bit 206 at a distance from the end 207 so as to prevent contact between the drill bit's end 207 and the hammer 203. For penetrating metal, a drill bit head cutting portion 205 is selected or formed having configured with geometry or cutting structure formed or selected for effectiveness in boring through metal when driven by a torsional moment.

Figure 3:
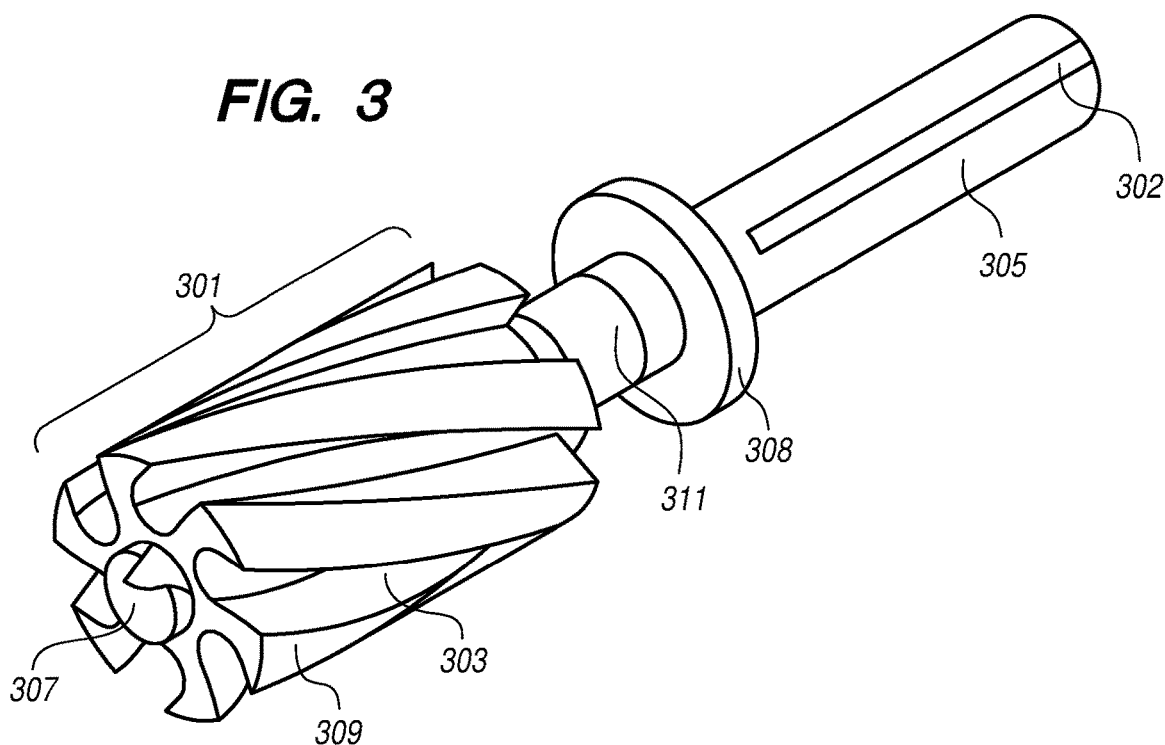
FIG. 3 shows a perspective view of a drill bit in accordance with one embodiment of the invention.

Referring to FIG. 3, an embodiment of an exemplary embodiment of this disclosure is provided comprises a cutting head 301 coupled, e.g., welded or fixed therewith, to a drill bit (e.g., steel) assembly shaft and a Slotted Drive System (SDS) Max shank section 305 at a weld section 311 opposite of end section 302. A protuberance or protrusion 308 (e.g., shaft collar, mechanical stop, etc.) is coupled to a shank section 305 of the drill bit at such a distance from the end section 302 so as to prevent a full 90 mm insertion of the SDS Max shank section 305 into a SDS Max drill chuck cavity, while still allowing for a secure fit and mechanical coupling within the chuck. Placement of the protuberance or protrusion 308 creates a gap at the end section 302 thus preventing the drill's hammer from striking the drill bit's end section 302.

Exemplary cutting head 301 comprises a guide cutting tip 307, a plurality of cutting edges 309, and a plurality of helical or twist flutes 303 between the cutting edges 309. The cutting head 301 includes grooves (flutes 303) helically coiled around a rod-like inner shank that define the cutting edges 309 at an intersection between flutes 303 and a face of cutting head 301 perpendicular to its axis. The flutes 303 are milled to a depth so as to create cutting edges 309 which extend radially from an intersection of a base of the guide cutting tip 307 to an outer circumference of cutting head 301 so that a primary cutting action of the bit occurs across an area constituting the face of the cutting head 301. Exemplary geometry of the cutting head is optimized for cutting a portion of metal backed by rock, concrete, masonry, etc. material. An exemplary guide cutting tip may include a cone with an angle of one hundred and thirty five degrees at an apex. Exemplary cutting edges may be defined by a forty five degree intersection between the flutes 303 and the cutting head 301.

As the inventive apparatus as shown in FIG. 3 is configured to penetrate steel backed by a rock, masonry, concrete, etc. material, when a guide cutting tip 307 exits the portion of metal, it will encounter a rock, concrete, masonry, etc. backing material before a face of the cutting head 301 has completed a boring operation. Due to the fact that the boring operation will be accomplished without benefit of a drill's hammer function, the backing material will present a substantial obstacle when encountered. This backing material makes it desirable to limit a height of the guide cutting tip 307 by limiting a radius of a cone so as to limit an amount of backing material which must be removed prior to the face of the cutting head 301 completing the penetration of the metal, allowing a reversion to a traditional masonry bit.

FIG. 3 shows an embodiment designed to cut a 2" diameter hole in 2" deep material. An exemplary design can change to suit a required diameter and potential material to be encountered. A number of cutters or flute design aspects can be adjusted depending on a desired drilling RPM and cutting material. A direction of cutting edge grooves/flutes/threads can be "left handed" if required by an intended hammer-drill. This embodiment is particularly suited for instances in which a plate to be penetrated is encountered after boring through some thickness of rock.

Figure 4:
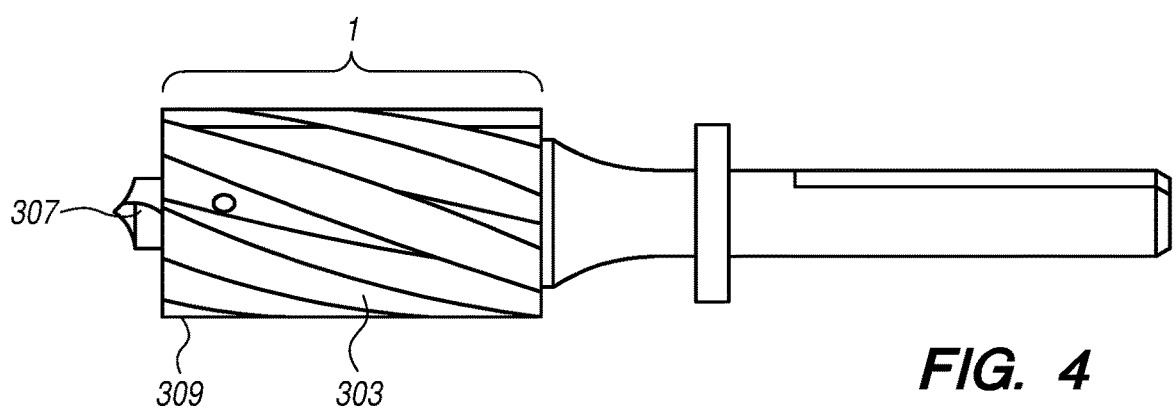
FIG. 4 shows a longitudinal cross section view of an exemplary drill having at least some common elements with embodiments shown at, e.g., FIG. 3, in accordance with an embodiment of the invention.

Referring to FIG. 4, an additional embodiment designed to cut 1½" diameter holes is shown. The FIG. 4 embodiment includes some common structures from FIG. 4. An exemplary cutting head 301 comprises a guide cutting tip 307 with angled faces, e.g., one hundred and thirty five degrees, and extending a predetermined distance, a plurality of cutting edges 309, and flute 303 (other flutes 303 are not shown in this cross sectional figure).

Figure 5:
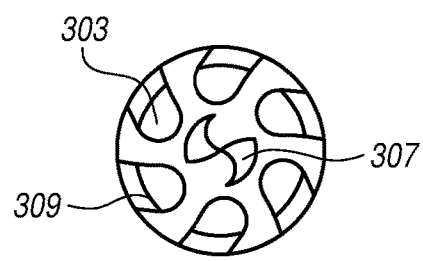
FIG. 5 shows a cross section view of an exemplary drill bit having at least some common elements with embodiments shown at, e.g., one or more of FIG. 3-4, in accordance with an embodiment of the invention.

Referring to FIG. 5, a different cross section view of an embodiment of the invention is shown. A plurality of cutting edges 309 is shown as well as a plurality of flutes 303.

Figure 6:
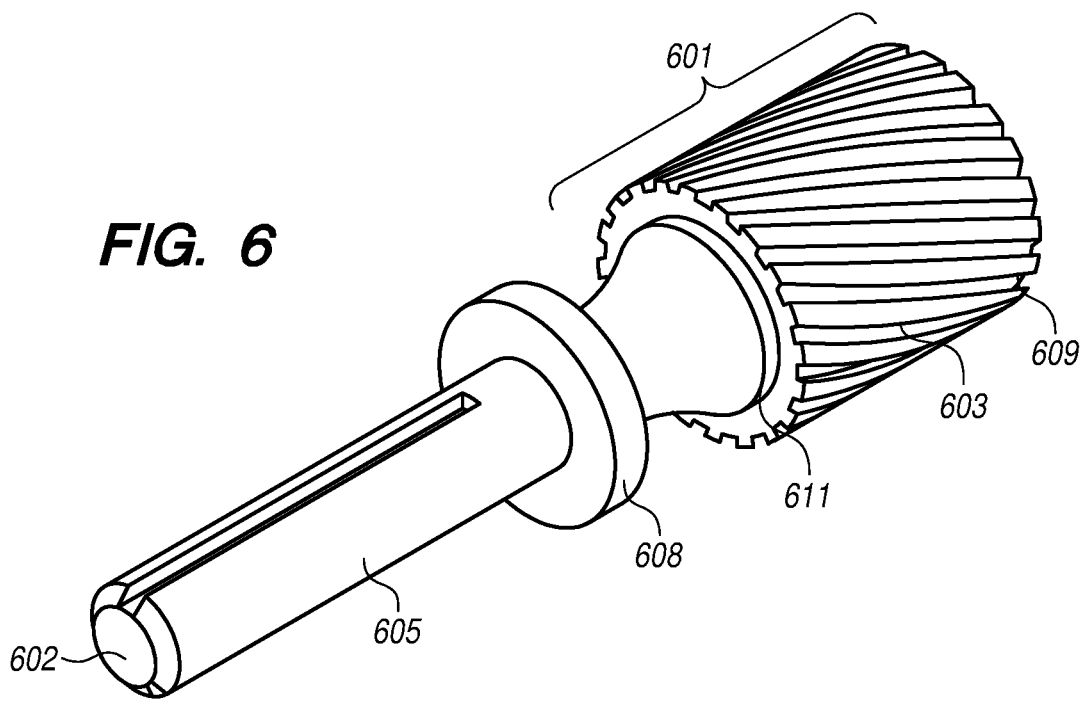
FIG. 6 shows a perspective view of an exemplary drill bit with at least some common elements from FIGS. 3-5 suited to address instances where a portion of metal to be penetrated is encountered on a surface of a rock rather than embedded within a target structure in accordance with an embodiment of the invention.

FIG. 6 shows an additional embodiment particularly suited to address instances where a portion of the metal to be penetrated is encountered on a surface of a rock rather than embedded within. This embodiment of the invention comprises a cutting head 601 coupled, e.g., welded, to a drill steel assembly shaft and an SDS Max shank section 605 at a weld section 611 opposite of an end section 602. A protuberance or protrusion 608 (e.g., mechanical stop or shaft collar) is coupled to a shank section 605 at such a distance from the end section 602 as to prevent, a full ninety mm insertion of the shank section 605 into a SDS Max drill chuck, while still allowing for a secure fit and mechanical coupling of the bit within the chuck. Forming or placement of protuberance or protrusion 608 creates such as gap at the end section 602 as is necessary to prevent the drill's hammer from striking the end section 602. Exemplary cutting head 601 comprises an annular cutter with a plurality of cutting edges 609, and a plurality of helical or twist flutes 603 between the cutting edges 609.

FIG. 6 shows an embodiment designed to cut a 2" diameter hole in 2" deep material. An exemplary design can change to suit a required diameter and potential material to be encountered. A number of cutters or flute design aspects can be adjusted depending on a desired drilling RPM and cutting material. A direction of the cutting edge grooves/flutes/threads can be "left handed" if required by an intended hammer-drill.

Figure 7:
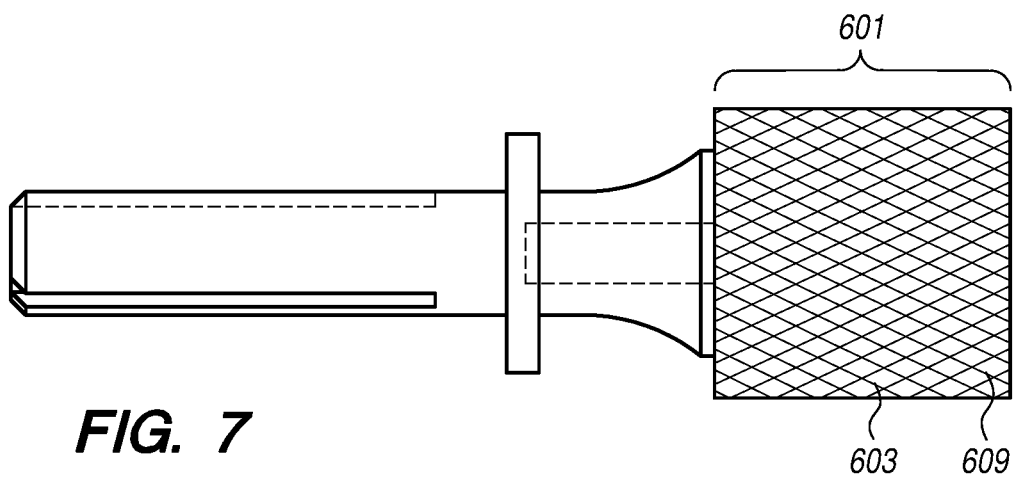
FIG. 7 shows a longitudinal cross section view of an exemplary drill bit, e.g., shown at least in part in one or more of FIGS. 3-6, in accordance with an embodiment of the invention.

Referring to FIG. 7, an additional embodiment designed to cut 1½" diameter holes is shown. FIG. 7 is comprised of at least some common elements as the embodiment shown in FIG. 6. Exemplary cutting head 601 comprises an annular cutter with a plurality of cutting edges 609, and flutes 603 (other flutes 603 are not shown in this cross sectional figure).

Figure 8:
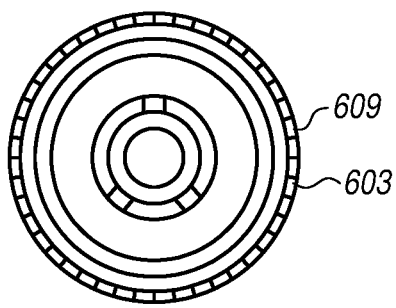
FIG. 8 shows a cross section view of an exemplary drill bit, e.g., shown at least in part in one or more of FIGS. 3-7, in accordance with an embodiment of the invention.

Referring to FIG. 8, a different cross section view of an embodiment of the invention is shown. A plurality of cutting edges 609 is shown as well as a plurality of flutes 603. A hollow inner diameter of an annular cutter is shown in this view.

Although the invention has been described in detail with reference to certain preferred embodiments, variations and modifications exist within the spirit and scope of the invention as described and defined in the following claims.

The invention claimed is:
1. A method of drilling comprising:
identifying a task requiring rock drilling with a hammer-drill in a location where a likelihood exists of encountering a portion of metal and where it is desirable to carry only a single drill;
providing a metal-cutting bit comprising a cylindrical body formed with a first and second cylindrical sections, wherein the first section comprises a shank section, wherein the second section comprises a cutting section of a selected diameter to bore a desired diameter hole;
coupling a minimum of one protuberance to the first section at a first section coupling point a first distance from a longitudinal end of the first section opposite and facing away from the second section, wherein the first distance is selected so as to prevent full insertion of the first section into a chuck section of the hammer-drill, and wherein the first distance is further selected to prevent a hammer section in the hammer-drill from striking the longitudinal end of the first section while the hammer section of the hammer-drill is in operation;
providing said hammer-drill wherein the hammer-drill's hammer or percussive feature is continuously operating;
selecting a masonry bit with a diameter determined to create a desired bore in a rock;
securing the masonry bit in the hammer-drill and commencing rock drilling to establish a bore hole;
continuing drilling operations until the portion of metal is encountered;
removing the masonry bit and the hammer-drill from the bore hole and decoupling the masonry bit from the hammer-drill;
inserting the first section of the metal-cutting bit into the hammer drill chuck section until the protuberance comes into contact with the chuck section, then securing the metal-cutting bit in the hammer-drill and inserting the second section of the metal-cutting bit into the bore hole until contacting the portion of metal;
resuming drilling operations until the portion of metal is fully penetrated;

removing the metal-cutting bit and the hammer-drill from the bore hole and decoupling the metal-cutting bit from the hammer-drill; and securing the masonry bit in the hammer-drill and inserting the masonry bit into the bore hole and continuing drilling operations until a selected depth of bore is achieved.

2. The method of claim 1 further comprising:

forming the second section as a cylindrical cutting section having a cylindrical side wall surrounding a longitudinal central axis of the metal-cutting bit passing between opposing ends of the metal-cutting bit, a circular cutting end opposite the first section and having a circumference when viewed from an axial direction thereof;

forming a guide tip with a plurality of cutting faces formed at an angle to the circular cutting end centered upon the longitudinal central axis, wherein the guide tip forms a cone with a base and an apex opposite each other, the base coupled to or extending from the circular cutting end; and forming a plurality of helical flutes on the cylindrical side wall penetrating or extending into the second section, wherein the plurality of helical flutes are further formed in a section extending from the cutting end towards an interface area between the first and the second section, the cutting face further comprising cutting edges formed at an intersection or boundary of the helical flutes and the cutting face.

3. The method of claim 2 further comprising:

forming the protuberance during a manufacturing process as an integral portion of the first section.

4. The method of claim 2 further comprising:

forming the first section without the protuberance; and providing the protuberance as a removable collar coupled to the shank section by a plurality of set screws.

5. The method of claim 2 further comprising:

forming the first section with an outer diameter of 18 mm;

milling a portion of the shank section opposite the cutting section with a plurality of open grooves and a plurality of locking segments for use in the chuck section of the hammer-drill, wherein the chuck section comprises a slotted drive system (SDS) Max chuck; and forming the protuberance during a manufacturing process as an integral portion of the first section.

6. The method of claim 5 further comprising:

forming the apex of the guide tip to form a 135 degree angle between opposing sides of the guide tip; and milling the helical flutes so as to create a 45 degree angle at the intersection or boundary of the helical flutes and the cutting face.

7. The method of claim 2 further comprising:

forming the first section with an outer diameter of 18 mm;

milling a portion of the shank opposite the cutting section with a plurality of open grooves and a plurality of locking segments for use in the chuck section of the hammer-drill, wherein the chuck section comprises a slotted drive system (SDS) Max chuck;

forming the first section without the protuberance; and providing the protuberance as a removable collar coupled to the shank by a plurality of set screws.

8. The method of claim 7 further comprising:

forming the apex of the guide tip to form a 135 degree angle between opposing sides of the guide tip; and milling the helical flutes so as to create a 45 degree angle at the intersection or boundary of the helical flutes and the cutting face.

9. The method of claim 1 further comprising:

forming a plurality of cutting edges circumferentially spaced around the cutting face of the metal-cutting bit configured to cut a plurality of chips from the portion of metal, wherein the plurality of flutes are configured to discharge the chips from the bore hole.

10. The method of claim 9 further comprising:

forming the protuberance during a manufacturing process as an integral portion of the first section.

11. The method of claim 9 further comprising:

forming the first section without the protuberance; and providing the protuberance as a removable collar coupled to the shank by a plurality of set screws.

12. The method of claim 9 further comprising:

forming the first section with an outer diameter of 18 mm;

milling a portion of the shank opposite the cutting section with a plurality of open grooves and a plurality of locking segments for use in the chuck section of the hammer-drill, wherein the chuck section comprises a slotted drive system (SDS) Max chuck; and forming the protuberance during a manufacturing process as an integral portion of the first section.

13. The method of claim 9 further comprising:

forming the first section with an outer diameter of 18 mm;

milling a portion of the shank opposite the cutting section with a plurality of open grooves and a plurality of locking segments for use in the chuck section of the hammer-drill, wherein the chuck section comprises a slotted drive system (SDS) Max chuck;

forming the first section without the protuberance; and providing the protuberance as a removable collar coupled to the shank by a plurality of set screws.

\* \* \* \* \*